United States Patent
Bae et al.

(10) Patent No.: US 12,024,576 B2
(45) Date of Patent: Jul. 2, 2024

(54) QUATERNIZED POLYAROMATICS FOR USE IN ELECTROCHEMICAL DEVICES

(71) Applicant: ORION POLYMER CORP., Cohoes, NY (US)

(72) Inventors: Chulsung Bae, Cohoes, NY (US); Gregory Kline, Kendallville, IN (US); Bharat Shrimant, State College, PA (US); Ding Tian, Troy, NY (US); Xiaofeng Wang, Katy, TX (US); Yu Seung Kim, White Rock, NM (US); Eun Joo Park, Santa Fe, NM (US); Santosh Adhikari, Los Almos, NM (US)

(73) Assignee: ORION POLYMER CORP., Cohoes, NY (US)

( * ) Notice: Subject to any disclaimer, the term of this patent is extended or adjusted under 35 U.S.C. 154(b) by 0 days.

(21) Appl. No.: 18/164,980

(22) Filed: Feb. 6, 2023

(65) Prior Publication Data
US 2023/0250207 A1    Aug. 10, 2023

Related U.S. Application Data

(60) Provisional application No. 63/307,532, filed on Feb. 7, 2022, provisional application No. 63/342,981, filed on May 17, 2022.

(51) Int. Cl.
*C08F 232/06* (2006.01)
*B01J 41/14* (2006.01)
(Continued)

(52) U.S. Cl.
CPC .............. *C08F 232/06* (2013.01); *B01J 41/14* (2013.01); *C08K 5/17* (2013.01); *C08G 10/00* (2013.01); *C08G 61/02* (2013.01); *C08G 2261/1422* (2013.01); *C08G 2261/143* (2013.01); *C08G 2261/145* (2013.01); *C08G 2261/146* (2013.01); *C08G 2261/147* (2013.01);
(Continued)

(58) Field of Classification Search
None
See application file for complete search history.

(56) References Cited

U.S. PATENT DOCUMENTS 10,290,890 B2    5/2019  Yan et al.
10,435,504 B2 *  10/2019 Bae .................... C08G 61/02
(Continued)

FOREIGN PATENT DOCUMENTS

WO    WO-2016081432 A1 *  5/2016  ............. A01N 29/00

OTHER PUBLICATIONS

Prakash et al., ACS Applied Energy Materials, 2021, 4(6), 5858-5867 (Year: 2021).*

(Continued)

*Primary Examiner* — Satya B Sastri
(74) *Attorney, Agent, or Firm* — Ohlandt, Greeley and Perle, LLP

(57) ABSTRACT

Disclosed herein in various embodiments are aryl-ether free polyaromatic polymers based on random copolymer architecture with two, three, or more aromatic ring components and methods of preparing those polymers. The polymers of the present disclosure can be used as ion exchange membranes, e.g., as anion exchange membranes, and ionomer binders in alkaline electrochemical devices.

18 Claims, 1 Drawing Sheet

(51) Int. Cl.
  *C08G 10/00* (2006.01)
  *C08G 61/02* (2006.01)
  *C08K 5/17* (2006.01)
  *H01M 8/1004* (2016.01)

(52) U.S. Cl.
  CPC . *C08G 2261/148* (2013.01); *C08G 2261/149* (2013.01); *C08G 2261/31* (2013.01); *C08G 2261/312* (2013.01); *C08G 2261/314* (2013.01); *C08G 2261/33* (2013.01); *C08G 2261/45* (2013.01); *H01M 8/1004* (2013.01)

(56) References Cited

U.S. PATENT DOCUMENTS

| | | | | |
|---|---|---|---|---|
| 10,622,657 | B1* | 4/2020 | Kim | H01M 8/1023 |
| 2017/0252707 | A1 | 9/2017 | Bahar et al. | |
| 2020/0055980 | A1* | 2/2020 | Bae | C09D 5/14 |
| 2021/0363291 | A1* | 11/2021 | Kohl | C08J 5/2256 |

OTHER PUBLICATIONS

Tao et al., Journal of Membrane Science, 120432, p. 1-12, Feb. 4, 2022 (Year: 2022).*

Olvera al., Macromolecules, 46 7245-7256, Aug. 2013 (Year: 2013).*

Jiang, Tao et al., Highly Stable Poly(p-quaterphenylene alkylene)-based Anion Exchange Membranes, 647 Journal of Membrane Science 120342 (2022).

Olvera, Lilian I. et al., Novel High Molecular Weight Aromatic Fluorinated Polymers From One-Pot, Metal-Free Step Polymerizations, 46 Macromolecules 7245-7256 (2013).

Yamamoto et al., Preparation of Poly(p-phenylene) by Electrooxidative Polymerization in Acidic Media, 61 Bulletin of the Chemical Society of Japan, 1731-1734 (1988).

Mahmoud et al., High Hydroxide Ion Conductivity with Enhanced Alkaline Stability of Partially Fluorinated and Quaternized Aromatic Copolymers as Anion Exchange Membranes, 50 Macromolecules 4256-4266 (2017).

Notification of Transmittal of the International Search Report and the Written Opinion of the International Searching Authority for International Application No. PCT/US23/12399, dated Jul. 7, 2023.

* cited by examiner

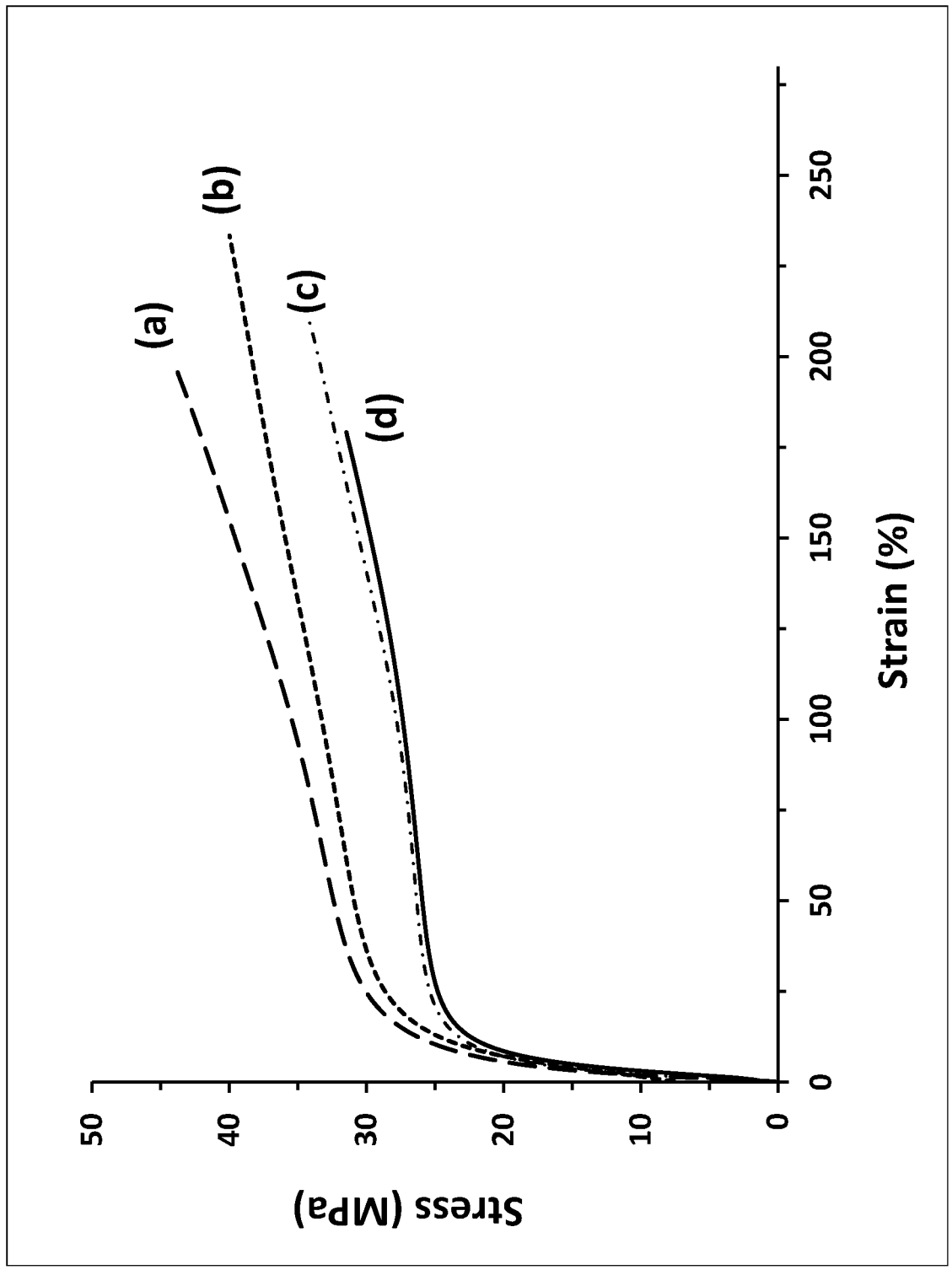

QUATERNIZED POLYAROMATICS FOR USE IN ELECTROCHEMICAL DEVICES

CROSS-REFERENCE TO RELATED APPLICATIONS

The present application claims the benefit under 35 U.S.C. § 119 of U.S. Provisional Application Ser. No. 63/307,532, filed on Feb. 7, 2022 and 63/342,981, filed on May 17, 2022, each of which is incorporated herein in their entirety.

STATEMENT REGARDING FEDERALLY SPONSORED RESEARCH AND DEVELOPMENT

This invention was made with U.S. Government support under Grant Numbers DE-AR0000769 and DE-AR0001003 awarded by the Advanced Research Projects Agency-Energy (ARPA-E) of Department of Energy. The United States Government has certain rights in the invention.

BACKGROUND

Fuel cells, water electrolyzers, and flow batteries are important chemical-energy conversion devices for sustainable and renewable energy infrastructures. Polymer electrolytes serve as ion exchange membranes in these electrochemical devices.

Aryl ether-free polyaromatics are potential polymer electrolytes that can be used as stable membranes for electrochemical devices because aryl ether groups are not chemically stable under high pH conditions. Currently developed aryl ether group-free quaternized polyaromatic electrolytes have limited mechanical properties that may result in membrane failure, such as membrane thinning or pinhole formation, when they are exposed to the highly oxidative operating conditions of electrochemical devices. The problems associated with poor mechanical properties of aryl ether-free quaternized polyaromatics have been approached by several methods, such as synthesizing higher molecular weight polymers, and reinforcement. The higher molecular weight polymer synthesis process often requires higher polymerization temperatures and/or longer reaction times, which increase the chance of having side reactions. Although the reinforcement methods show a significant improvement in tensile strength of the polymers, it requires an additional process to obtain the polymer electrolyte membranes, and it does not allow follow-up functionalization or further fabrication.

SUMMARY

The present disclosure provides aryl ether-free polyaromatic polymers based on random copolymer architecture with two, three, or more aromatic ring components, and the preparation thereof. In some embodiments, the copolymers are crosslinked to enhance mechanical properties. In some embodiments, the polymers are functionalized with multi cationic groups to increase ion exchange capacity. The polymers of the present disclosure can be used as ion exchange membranes, e.g., as anion exchange membranes in alkaline electrochemical devices.

The present disclosure provides a copolymer according to Formula I:

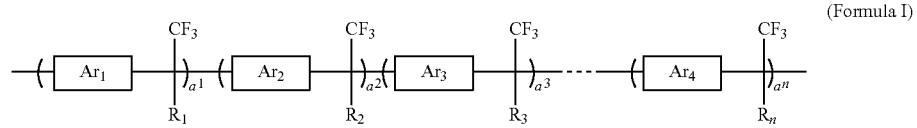
(Formula I)

wherein $Ar_1$, $Ar_2$, $Ar_3$, ... and $Ar_n$ are different aryl groups to form random copolymers, where n is 2 to 20, wherein each of $a_1$, $a_2$, $a_3$, ... and $a_n$ is, independently, 1 to 1,000,000, wherein $R_1$, $R_2$, $R_3$, ... and $R_n$ include

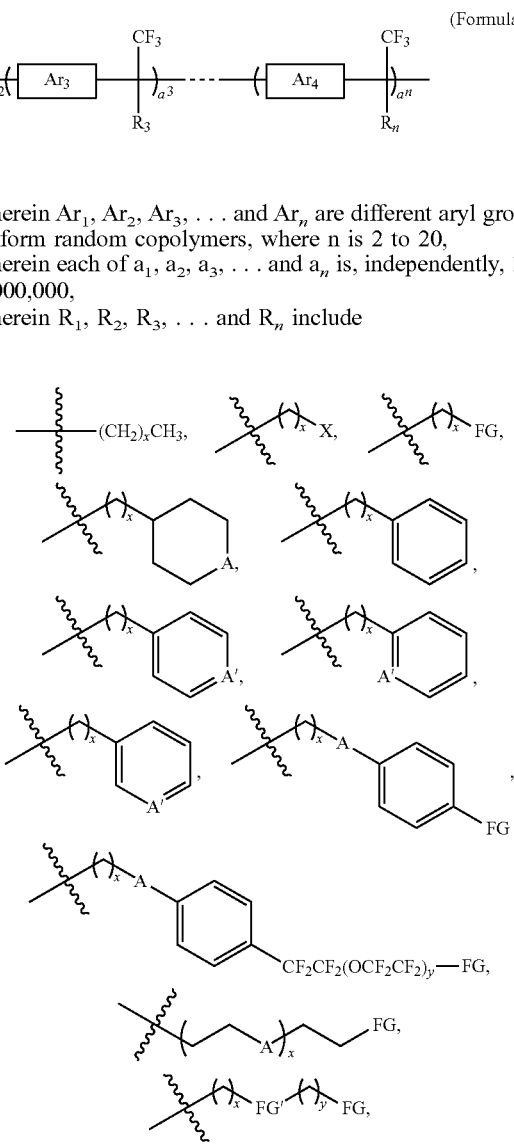

or combinations thereof, wherein A includes S, O, NH, $SO_2$, an alkyl group, e.g., $CH_2$ or $CH_2CH_3$, or combinations thereof; A' includes N, an alkyl group, or combinations thereof; X includes a halide, e.g., Br; FG includes $NR_3^+X^-$, $NR_3^+OH^-$, OH, $NR_2$, $SO_3H$, $P(=O)(OH)_2$, $CO_2H$, $SO_3^-M^+$, $P(=O)(O^-)_2$ $2M^+$, $CO_2^-M^+$ (M=Li, Na, K), linear multi-quaternary ammonium groups, branched multi-quaternary ammonium groups, crosslinked multi-quaternary ammonium groups, or combinations thereof; FG' includes $NR_2^+$ $X^-$, or $NR_2^+OH^-$; R is an alkyl group, such as, for example, $CH_3$ or $CH_2CH_3$; x is from 0 to 20; and y is from 0 to 20.

In some embodiments, $Ar_1$, $Ar_2$, $Ar_3$, ... and $Ar_n$ can be

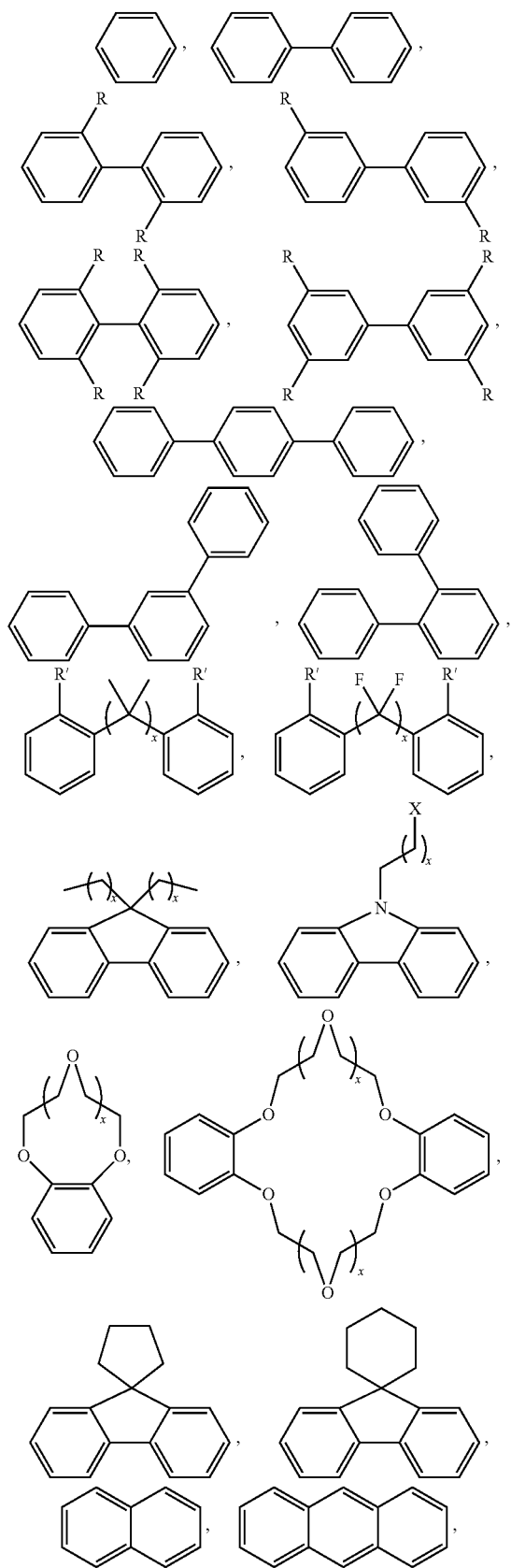

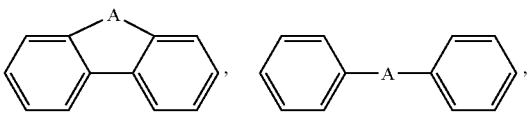

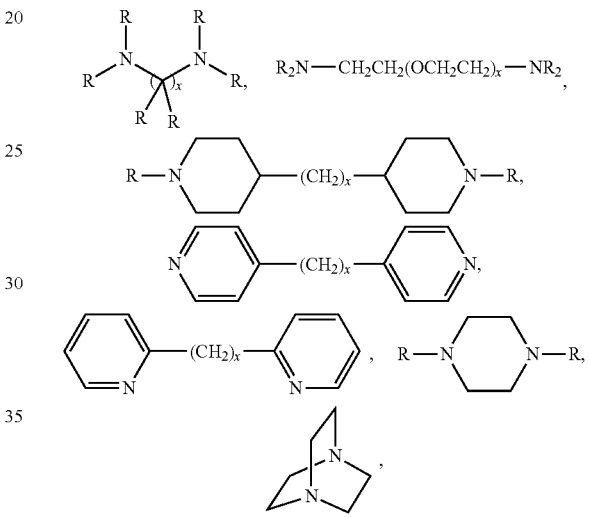

or combinations thereof, wherein R includes an alkyl group, e.g., $CH_3$ or $CH_2CH_3$, a halide, e.g., F, or combinations thereof; R' includes H, an alkyl group, e.g., $CH_3$ or $CH_2CH_3$, or combinations thereof; X includes a halide; A includes S, O, NH, $SO_2$, an alkyl group, such as, for example, $CH_2$ or $CH_2CH_3$, or combinations thereof; and x is from 0 to 20.

In some embodiments, the $R_1$, $R_2$, $R_3$, ... or $R_n$ are crosslinked by a crosslinking agent selected from a group consisting of:

and wherein $NHR_2$, N,N,N',N'-tetramethyl-1,6-hexanediamine, bis(2-dimethylaminoethyl)ether, diamines, multiamines or combinations thereof, wherein R include H, an alkyl group, such as for example, $CH_3$ or $CH_2CH_3$, or combinations thereof; and x is from 0 to 20. In some embodiments the copolymer has a degree of crosslinking of from 0% to 100%, or any subranges therebetween.

In some embodiments, the copolymer has an ion exchange capacity (IEC) of from about 0.5 to about 5.0 milliequivalents/gram. In some embodiments, the copolymer provided herein is used as a membrane or an ionomer binder in an electrochemical device.

In various embodiments, the copolymer is a random copolymer and provided herein is an ion exchange membrane comprising the random copolymer. In some embodiments, the ion exchange membrane has a mechanical stress greater than 30 MPa at about SOT and about 50% relative humidity. In some embodiments, a counter anion is chloride. In some embodiments, the random copolymer has a linear swelling ratio of about 10% to about 50% at 20° C. with hydroxide counter anions under deionized water. In some embodiments, the random copolymer has a hydroxide conductivity greater than 80 mS/cm under deionized water at 80° C. In some embodiments, provided herein is a fuel cell comprising the ion exchange membrane.

In some embodiments, provided is a random copolymer comprising formula II

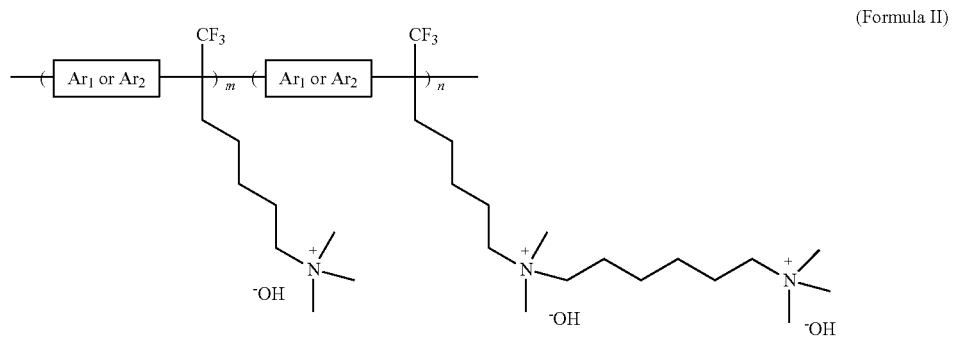

(Formula II)

wherein $Ar_1$ and $Ar_2$ are different aryl groups and each of m and n is, independently, 1 to 1,000,000. In various embodiments, $Ar_1$ and $Ar_2$ are independently selected from

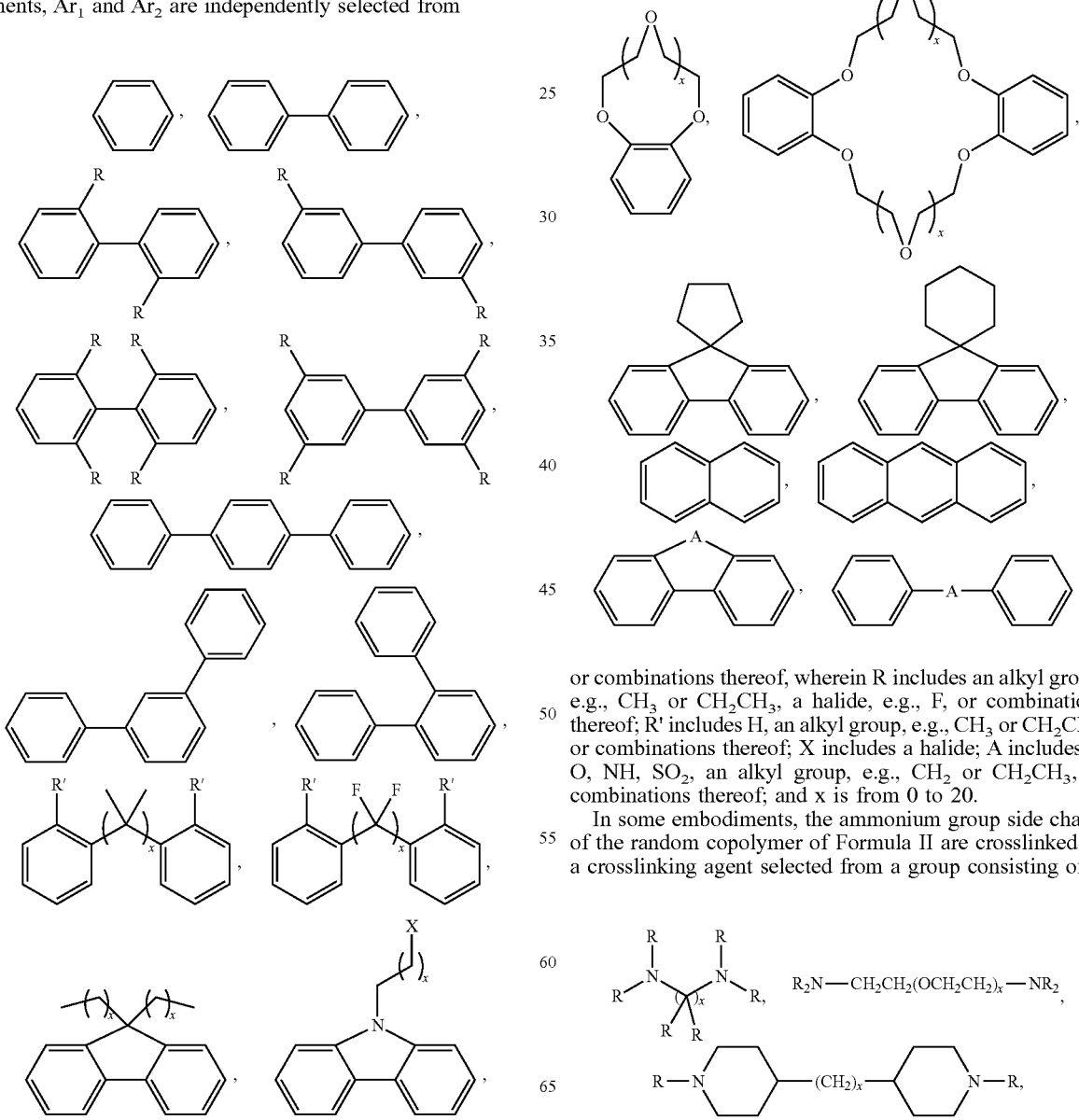

or combinations thereof, wherein R includes an alkyl group, e.g., $CH_3$ or $CH_2CH_3$, a halide, e.g., F, or combinations thereof; R' includes H, an alkyl group, e.g., $CH_3$ or $CH_2CH_3$, or combinations thereof; X includes a halide; A includes S, O, NH, $SO_2$, an alkyl group, e.g., $CH_2$ or $CH_2CH_3$, or combinations thereof; and x is from 0 to 20.

In some embodiments, the ammonium group side chains of the random copolymer of Formula II are crosslinked by a crosslinking agent selected from a group consisting of:

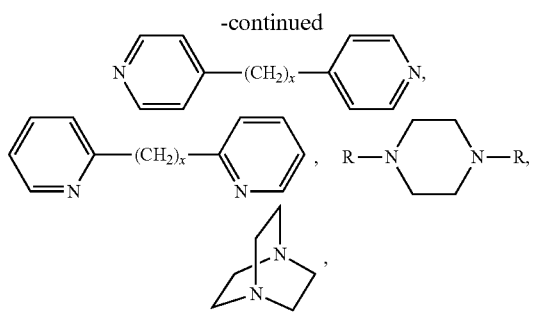

NR$_3$, N,N,N',N'-tetramethyl-1,6-hexanediamine, bis(2-dimethylaminoethyl)ether, diamines, multi-amines or combinations thereof, wherein R include H, an alkyl group, e.g., CH$_3$ or CH$_2$CH$_3$, or combinations thereof; and x is from 0 to 20. In some embodiments, the degree of crosslinking is from 0% to 100%. In some embodiments, the random copolymer has an ion exchange capacity (IEC) of from about 0.5 to about 5.0 milliequivalents/gram (mequiv./g.). The terms milliequivalents/gram and mequiv./g. are used interchangeably herein.

In some embodiments, provided herein is an ion exchange membrane comprising the random copolymer of Formula II. In some embodiments, the ion exchange membrane has a mechanical stress greater than 33 MPa at 50° C. and 50% relative humidity. In some embodiments, the counter anion is chloride. In some embodiments, the ion exchange membrane has linear swelling ratio of 10% to 50% with hydroxide counter anion under deionized water at 20° C. In some embodiments, the ion exchange membrane has a hydroxide conductivity greater than 80 mS/cm under deionized water at 80° C. In some embodiments, the ion exchange membrane comprises a crosslinked random copolymer. In some embodiments, the ion exchange membrane of the crosslinked random copolymer has a mechanical stress greater than 35 MPa at 50° C. and 50% relative humidity. In some embodiments, the counter ion is chloride. In some embodiments, the ion exchange membrane has a linear swelling ratio of 10% to 50% with hydroxide counter anion under deionized water at 20° C. In some embodiments, the ion exchange membrane has a hydroxide conductivity greater than 80 mS/cm under deionized water at 80° C.

In some embodiments, provided herein is a random copolymer according to Formula (Formula III)

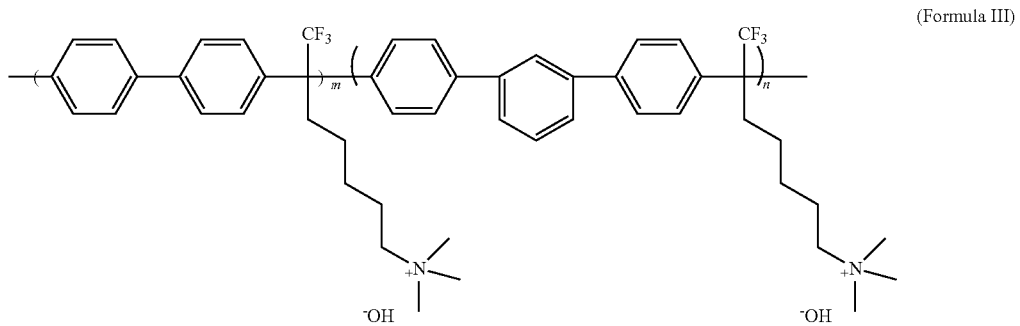

wherein m and n are each independently 1 to 1,000,000. In some embodiments, the ratio of m and n is from about 1:4 to about 4:1, or any subranges therebetween. In some embodiments, the random copolymer has an ion exchange capacity (IEC) of from about 0.5 to about 5.0 mequiv./g. In some embodiments, provided herein is an ion exchange membrane comprising the random copolymer of Formula III. In some embodiments, provided herein is an alkaline electrochemical device comprising a random copolymer according to Formula III.

In some embodiments, provided herein is a random copolymer according to Formula IV:

(Formula IV)

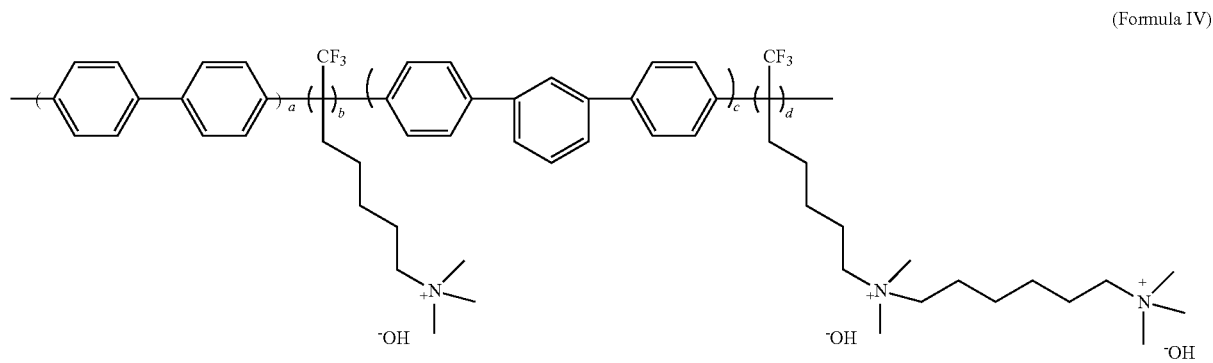

wherein a, b, c and d are each independently 1 to 1,000,000. In some embodiments, the ratio of a and c is from about 1:4 to about 4:1, or any subranges therebetween. In some embodiments, the random copolymer has an ion exchange capacity (IEC) of from about 0.5 to about 5.0 mequiv./g. In some embodiments, provided herein is an ion exchange membrane comprising the random copolymer of Formula IV. In some embodiments, provided herein is an alkaline electrochemical device comprising a random copolymer according to Formula IV.

As used in the present disclosure, the term "random copolymer" refers to a statistical copolymer, i.e. one in which the sequential distribution of the monomeric units obeys known statistical laws.

BRIEF DESCRIPTION OF THE DRAWINGS

FIG. 1 shows stress-strain curves of (a) 20% crosslinked BP-co-TPN1, (b) BP-co-TPN1, (c) TPN1 and (d) BPN1 at 50° C. and 50% relative humidity.

DETAILED DESCRIPTION OF THE DISCLOSURE

The present disclosure provides aryl ether-free polyaromatic polymers based on random copolymer architecture with two, three, or more aromatic ring components. Some embodiments of the present disclosure are directed to an electrochemical energy conversion system such as fuel cells, electrolyzers, flow batteries, or combinations thereof.

In some embodiments, the electrochemical energy conversion system includes at least one anode, at least one cathode, and one or more electrolytes in communication with the at least one anode and the at least one cathode. In some embodiments, the one or more electrolytes are disposed between an anode and a cathode. In some embodiments, the one or more electrolyte includes a solid electrolyte. In some embodiments, the one or more electrolytes includes a membrane, as will be discussed in greater detail below.

In some embodiments, the polymers are one or more polymers include a polyaryl or polyaromatic mainchain backbone, where the polyaryl backbone is composed of two or more different aryl monomers. In some embodiments, the aryl monomers are polyaryl monomers. In some embodiments, the polyaryl monomers include greater than 1, 2, 3, 4, 5, etc. ring structures, or combinations thereof. Copolymers made with two or more different randomized aromatic monomers show unexpectedly higher tensile strength compared to a homopolymeric counterpart with similar molecular weight. Without wishing to be bound by theory, this increase in tensile strength may be attributed to the non-uniformity of the backbone structure leading to higher chain entanglement.

In some embodiments, the monomers include, for example,

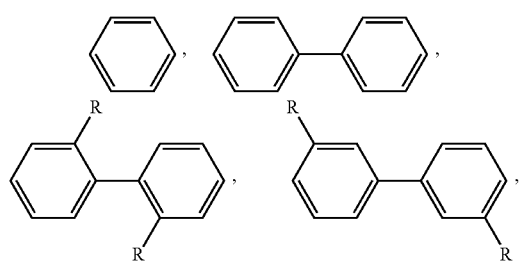

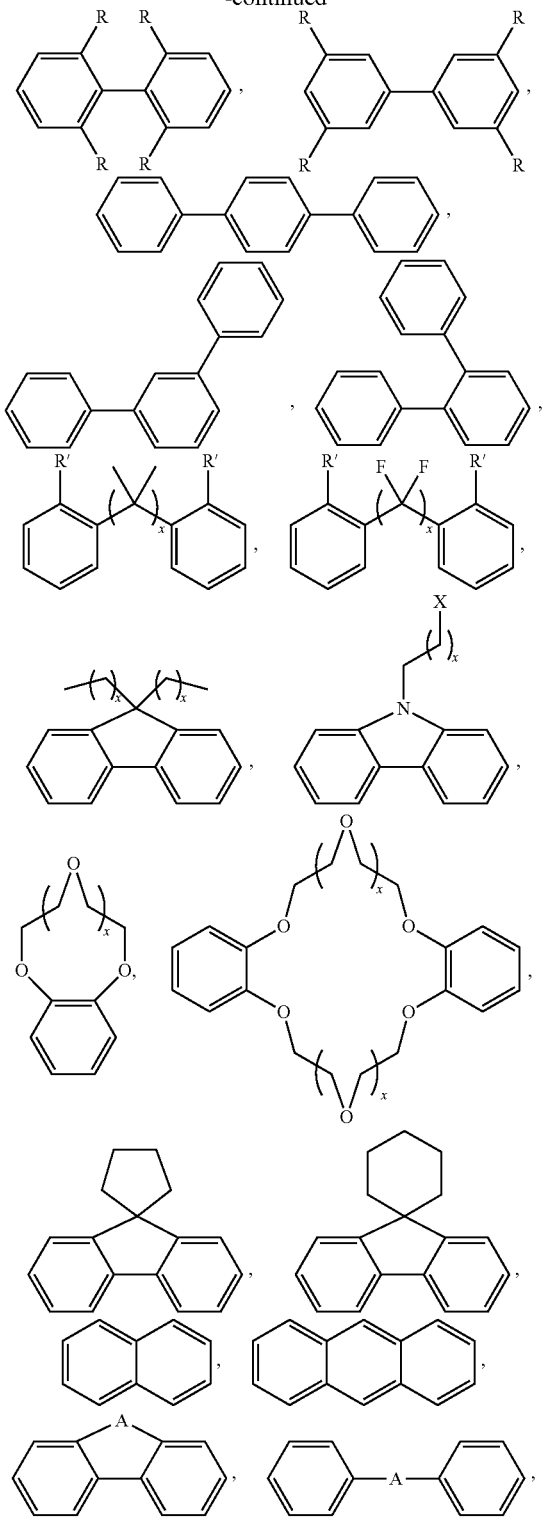

combinations thereof; R' includes H, an alkyl group, e.g., $CH_3$, or combinations thereof; X includes a halide; A includes S, O, NH, $SO_2$, an alkyl group, e.g., $CH_2$, or combinations thereof; and x is from about 0 to about 20.

In some embodiments, the polymer is functionalized with one or more side chains. In some embodiments, the one or more side chains include one or more alkyl groups, e.g., $CH_3$, cycloalkyl groups, phenyl groups, halide groups, hydroxide groups, an ammonium groups, linear multi-quaternary ammonium groups, branched multi-quaternary ammonium groups, crosslinked multi-quaternary ammonium groups, sulfonate groups, phosphonate groups, carboxylate groups, amines, alcohols, or combinations thereof. In some embodiments, the one or more side chains are substituted with one or more functional groups. In some embodiments, the functional groups include one or more alkyl groups, e.g., CH$_3$, cycloalkyl groups, phenyl groups, halide groups, hydroxide groups, an ammonium groups, linear multi-quaternary ammonium groups, branched multi-quaternary ammonium groups, crosslinked multi-quaternary ammonium groups, sulfonate groups, phosphonate groups, carboxylate groups, amines, alcohols, or combinations thereof. In some embodiments, the one or more side chains are saturated, partially saturated, or combinations thereof.

In some embodiments, the polymer includes the following Formula I:

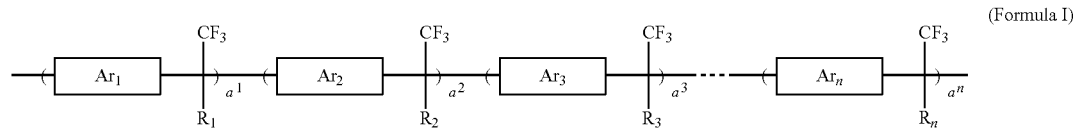

(Formula I)

In some embodiments, Ar$_1$, Ar$_2$, Ar$_3$, . . . and Ar$_n$ include a polyaryl group. In some embodiments, Ar$_1$, Ar$_2$, Ar$_3$, . . . and Ar$_n$ are different. In some embodiments, the copolymer of Formula I is a random copolymer made with two or more different aromatic monomers. In some embodiments, Ar$_1$, Ar$_2$, Ar$_3$, . . . and Ar$_n$ include

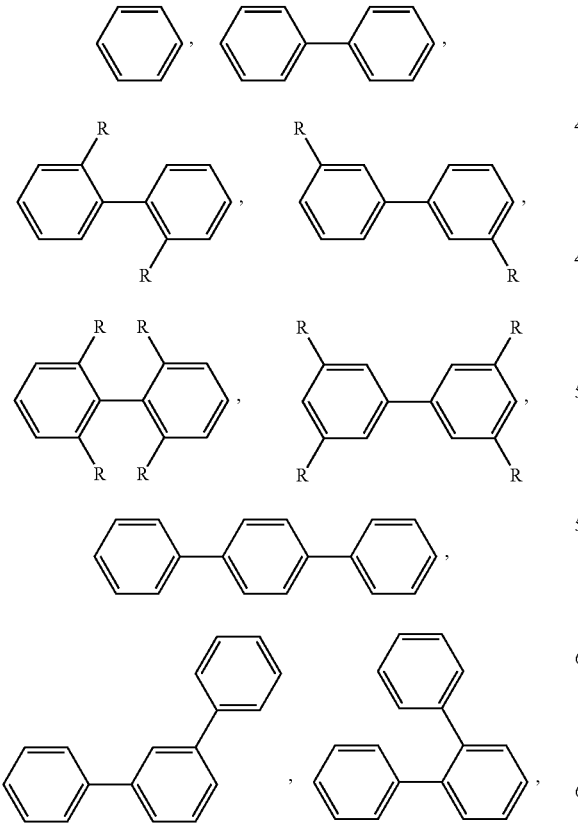

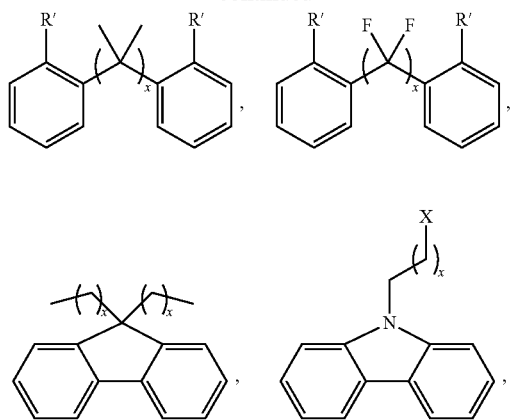

-continued

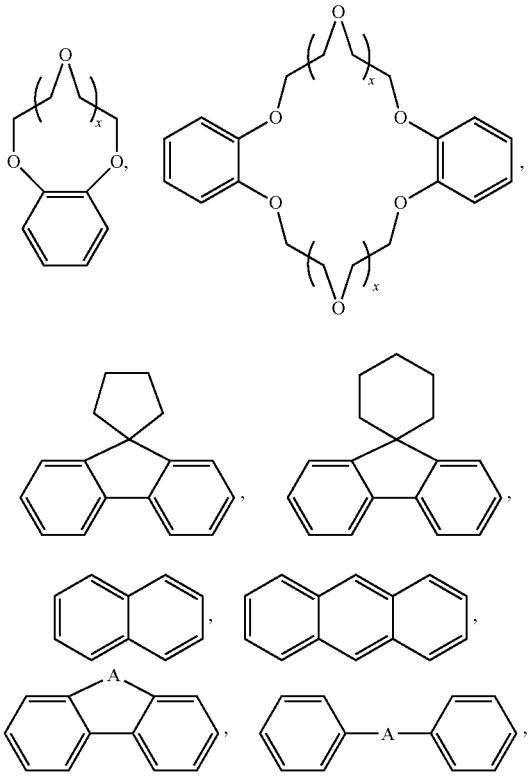

or combinations thereof, wherein R includes an alkyl group, e.g., CH$_3$, a halide, e.g., F, or combinations thereof; R' includes H, an alkyl group, e.g., CH$_3$, or combinations thereof; X includes a halide; A includes S, O, NH, SO$_2$, an alkyl group, e.g., CH$_2$, or combinations thereof; and x is from 0 to 20. In some embodiments, $a_1+a_2+a_3+ \ldots +a_n$ is from 10 to 1,000,000. In some embodiments, R$_1$, R$_2$, R$_3$, . . . and R$_n$ include

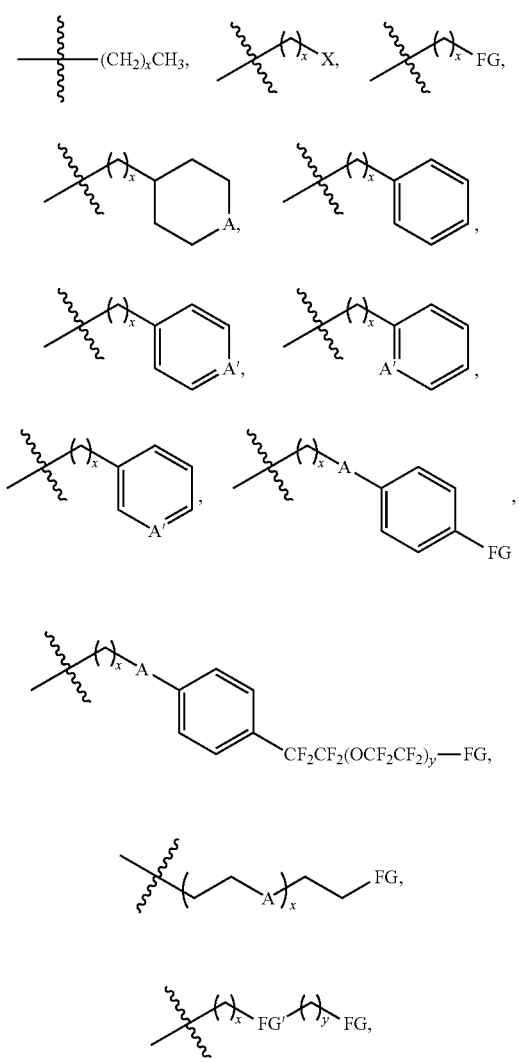

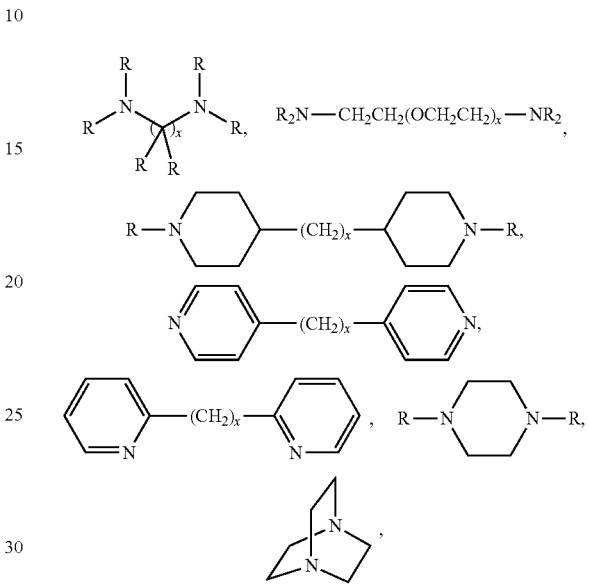

thereof; FG' includes $NR_2^+X^-$, $NR_2^+OH^-$; R is an alkyl group, e.g., $CH_3$ or $CH_2CH_3$; x is from 0 to 20; and y is from 0 to 20.

In some embodiments, one or more of the polymers described above are crosslinked to improve their mechanical properties including tensile strength by addition of crosslinking agent. In some embodiments, the crosslinking agent includes $NR_3$, N,N,N',N'-tetramethyl-1,6-hexanediamine, bis(2-dimethylaminoethyl)ether, diamines, multi-amines or combinations thereof, wherein R include H, an alkyl group, e.g., $CH_3$ or $CH_2CH_3$, or combinations thereof; and x is from 0 to 20. In some embodiments, the degree of crosslinking is from 0% to 100%.

In some embodiments, ion exchange capacity (IEC) of the copolymer is from 0.5 to 5.0 mequiv./g. In some embodiments, the copolymer includes the following Formula II:

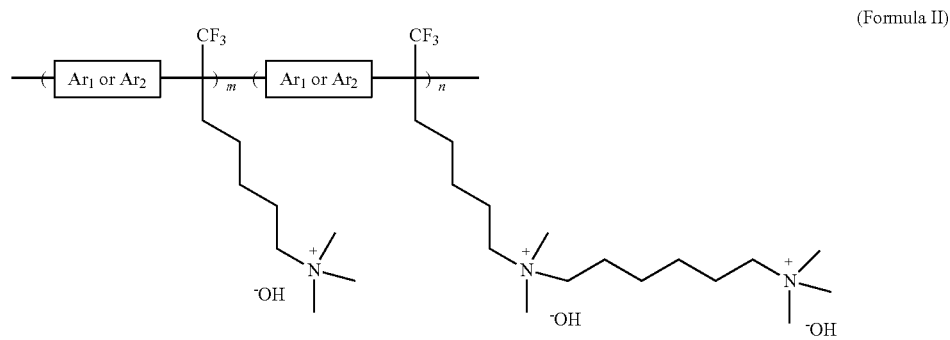

(Formula II)

or combinations thereof, wherein A includes S, O, NH, $SO_2$, an alkyl group, or combinations thereof; A' includes N, an alkyl group, or combinations thereof; X includes a halide, e.g., Br; FG includes $NR_3^+X^-$, $NR_3^+OH^-$, OH, $NR_2$, $SO_3H$, $P(=O)(OH)_2$, $CO_2H$, $SO_3^-M^+$, $P(=O)(O^-)_2$ $2M^+$, $CO_2^-M^+$ (M=Li, Na, K), linear multi-quaternary ammonium groups, branched multi-quaternary ammonium groups, crosslinked multi-quaternary ammonium groups, or combinations Ar1 and Ar2 are different aryl groups to form a random copolymer. In some embodiments, Ar1 and Ar2 include biphenyl, meta- or para-terphenyl, or combinations thereof. Each of m and n is, independently, 1 to 1,000,000. IEC is varied by control of the ratio of m and n. In some embodiments, IEC is varied by control of degree of functionalization of the copolymer.

In some embodiments, the copolymer includes the following Formula III:

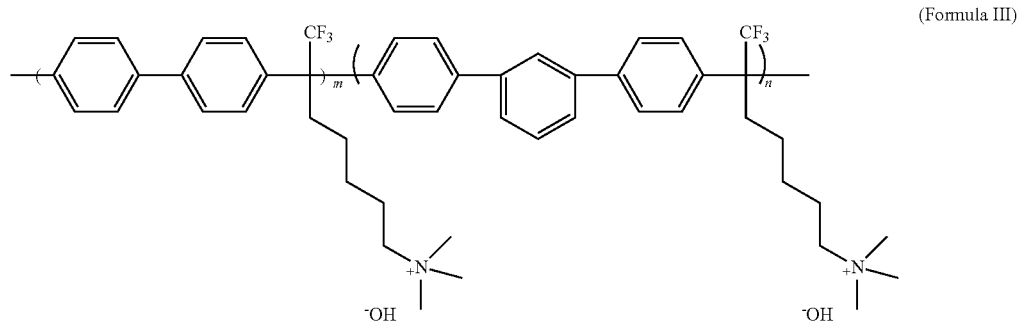

(Formula III)

In some embodiments, the copolymer is a random copolymer. In some embodiments, the ratio of m and n is from about 1:4 to about 4:1, or any subranges therebetween. Each of m and n is independently 1 to 1,000,000.

In some embodiments, the copolymer includes the following Formula IV:

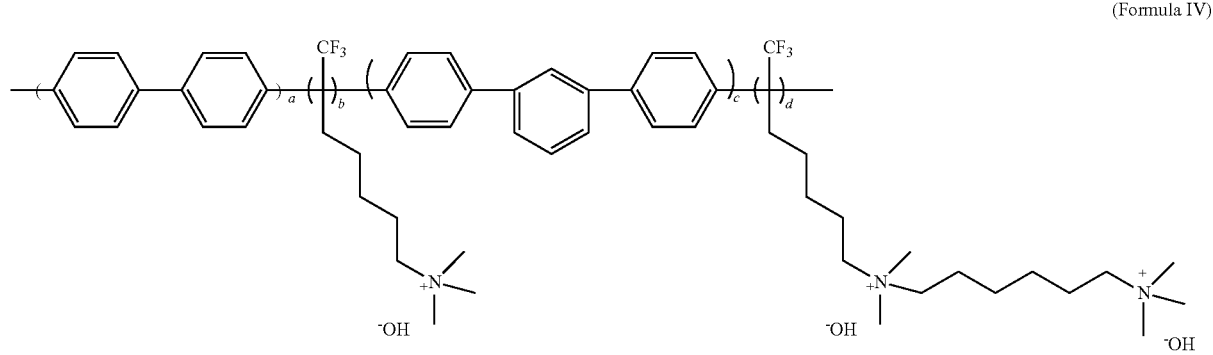

(Formula IV)

The copolymer of Formula IV is a random copolymer. In some embodiments, the ratio of a and c is from about 1:4 to about 4:1, or any subranges therebetween. Each of a, b, c and d is independently 1 to 1,000,000. In some embodiments, IEC is varied by the ratio of b and d. In some embodiments, IEC is of the copolymer is from 0.5 to 5.0 mequiv./g.

In some embodiments, one or more of the polymers described above form a membrane, e.g., ion exchange membrane. In some embodiments, the membrane has thickness from about 5 microns to about 300 microns. The thinner membrane, e.g., 5 to 50 microns, shows lower resistance and lower mechanical properties. The thicker membrane, e.g., over 75 microns, shows higher resistance and higher mechanical properties.

In some embodiments, the membrane described above includes one or more dopants. In some embodiments, the one or more dopants include phosphoric acid-based proton conductors, etc. In some embodiments, the polymers described above are utilized as quaternary ammonium-phosphonate, ion-pair coordinated proton conducting membranes in electrochemical devices. In some embodiments, the polymers are utilized as membranes capable of being operated at elevated temperatures and low relative humidity conditions. In some embodiments, the polymers are utilized as membranes capable of being operated at temperatures above about 80° C. In some embodiments, the polymers are incorporated, e.g., as a component of a membrane, in high temperature proton exchange membrane fuel cells, steam electrolyzers, etc., anion exchange membranes in alkaline electrochemical devices including low temperature fuel cells, low temperature water electrolyzers, $CO_2$ electrolyzers, electrochemical compressors, redox flow battery, electrodialysis, reverse electrodialysis where diffusion of anion is critical, etc., or combinations thereof.

Methods and systems of the present disclosure are advantageous in that they provide a combination of monomers that form favorable backbone structures to yield high mechanical strength polymers. The polymers include aryl ether-free quaternized polyaromatics produced by copolymerization of different aromatic ring structures.

Synthesis of polyaromatic electrolytes based on homopolymers has been reported, e.g., at WO 2016/081432. The polymerization process is done by acid-catalyzed Friedel-Crafts polycondensation, which is a promising method to form long chains of a repeating units composed of one aromatic monomer and one ketone monomer at room temperature in one pot. However, copolymers made with two or three different aromatic monomers show unexpected higher tensile strength compared to their homopolymer counterparts with similar molecular weight. Without wishing to be bound by theory, this increase in tensile strength may be due to the non-uniformity of the backbone structure that leads to higher chain entanglement.

By controlling polymer backbone structure and their entangled network, these polymers are advantageous for use in electrochemical devices, e.g., as ion exchange membranes with good mechanical properties in devices that require harsh operating conditions for higher performance. Controlling the composition of aromatic ring structure in the copolymer enables high mechanical strengths that can improve the device performance and durability.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

EXAMPLES

Example 1—BP-co-TPN1 Precursor

The BP-co-TPN1 precursor copolymer was synthesized by a reported method (Zolotukin, M. et al., *Macromolecules* 2013, 46, 7245) using superacid-catalyzed reaction of a functionalized trifluromethylalkyl ketone with two aromatic hydrocarbons, e.g., biphenyl and m-terphenyl.

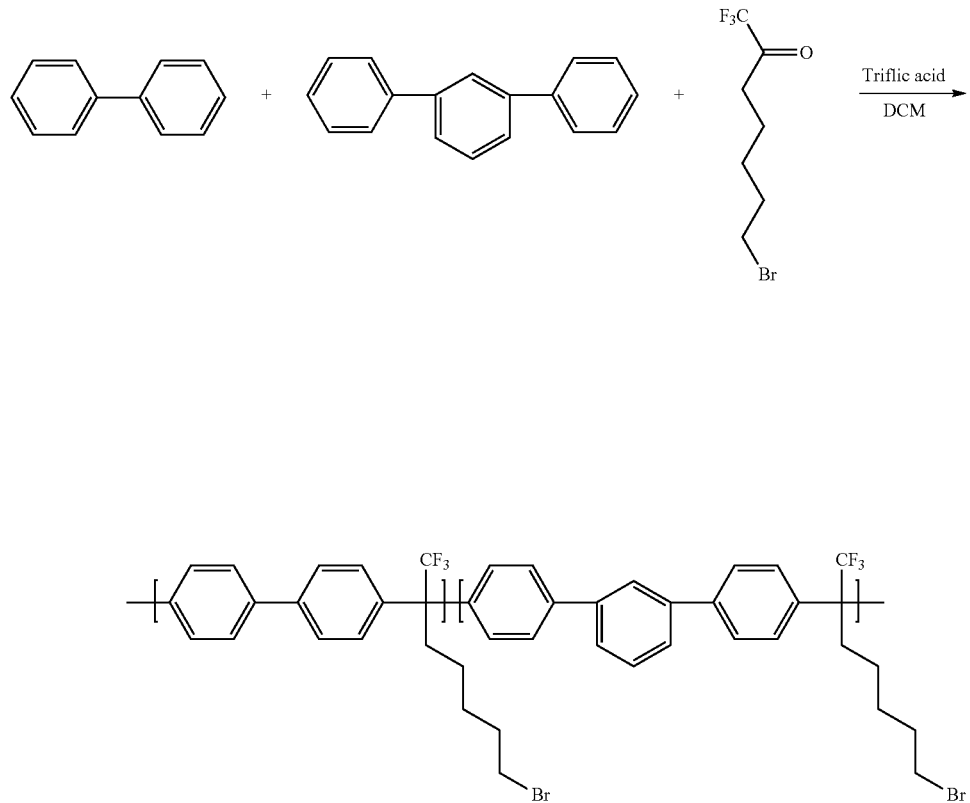

The polymer synthesis was carried at room temperature conditions. A mixture of 7-bromo-1,1,1-trifluroheptan-2-one (32 g, 130 mmol), biphenyl and m-terphenyl (10 g, 65 mmol and 15 g, 65 mmol respectively), methylene chloride (200 mL), and triflic acid (84 mL) was stirred at room temperature for 12 h and then poured into methanol. The copolymer was filtered and washed with methanol. After drying, 54 g of fiber type precursor polymer was obtained (99%).

Example 2—BP-co-TPN1

BP-co-TPN1 was synthesized by quaternization of alkyl bromide groups of BP-co-TPN1 precursor. This is a common method for preparation of anion exchange membranes. A mixture of BP-co-TPN1 precursor (50 g, 119 mmol), trimethylamine (31.2 g, 238 mmol), and a good solvent, such as DMF, DMAc, NMP and DMSO, was stirred at room temperature for 24 h and then poured into a poor solvent. The product was filtered and washed with the poor solvent.

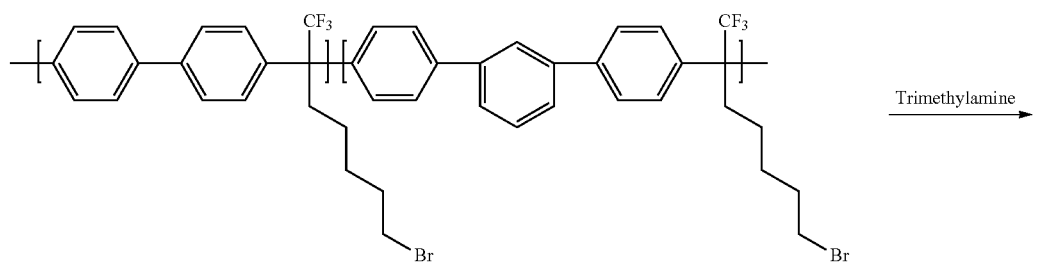

-continued

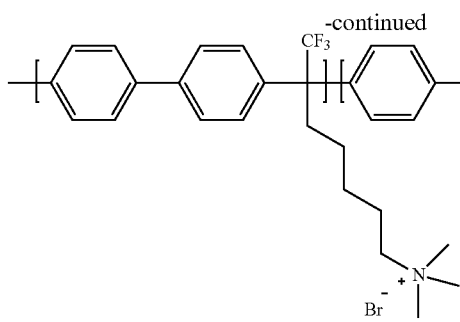 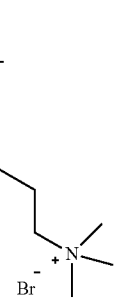

Table 1 below summarize mechanical properties of homopolymers, e.g., BPN1 and TPN1, copolymer, e.g., BP-co-TPN1, and 20% crosslinked copolymer. BP-co-TPN1 showed unexpectedly higher mechanical stress of 40 MPa compared to that of homopolymers, BPN1 or TPN1, while their elongation at break and hydroxide conductivity were in the similar range. Crosslinking 20% of BP-co-TPN1 with N,N,N',N'-tetramethyl-1,6-hexanediamine improved the mechanical strength further to 45 MPa.

TABLE 1

Mechanical property and hydroxide conductivity of homo-polymers and a random copolymer

| Sample code | Ar contents in polymer | Stress$^a$ (MPa) | Elongation at break$^a$ (%) | Conductivity (OH$^-$, 80° C.) |
|---|---|---|---|---|
| BPN1 | 100% biphenyl homopolymer | 30 ± 1 | 179 ± 5 | 122 mS/cm |
| TPN1 | 100% m-terphenyl homopolymer | 33 ± 1 | 209 ± 5 | 127 mS/cm |
| BP-co-TPN1 | 50% biphenyl and 50% m-terphenyl copolymer | 40 ± 2 | 237 ± 3 | 126 mS/cm |
| BP-co-TPN1 (20% Crosslinked) | 50% biphenyl and 50% m-terphenyl copolymer | 45 ± 2 | 250 ± 11 | 145 mS/cm |

$^a$Measured using Cl– form of anion exchange membranes under 50° C. and 50% relative humidity conditions.

FIG. 1 shows stress-strain curves of (a) 20% crosslinked BP-co-TPN1, (b) BP-co-TPN1, (c) TPN1 and (d) BPN1 with counter anion of chloride at 50° C. and 50% relative humidity. Copolymer (b) BP-co-TPN1 showed unexpectedly higher mechanical stress compared to those of homopolymers, (c) TPN1 or (d) BPN1. (a) 20% crosslinked of BP-co-TPN1 with N,N,N',N'-tetramethyl-1,6-hexanediamine showed higher mechanical stress than that of (b) BP-co-TPN1.

Table 2 below shows anion exchange membrane properties such as water uptake, hydroxide conductivity, and mechanical properties of 20% crosslinked BP-co-TPN1 with various IECs of 2.2, 2.4, 2.8, and 3.1 mequiv./g. All the copolymers with different IECs from 2.2 to 3.1 mequiv./g showed excellent ion conductivity and mechanical properties. The polymer electrolytes having the same chemical structures of backbone with various IEC give more options for users to select right polymer electrolyte for their purpose.

TABLE 2

Water uptake, hydroxide conductivity, and mechanical properties of 20% crosslinked BP-co-TPN1 with various ion exchange capacities

| Entry | Ion exchange capacity (mequiv./g) | Water uptake (OH$^-$, wt %) | Conductivity (OH$^-$, 80° C.) | Stress$^a$ (MPa) | Elongation at break$^a$ (%) |
|---|---|---|---|---|---|
| 1 | 2.2 | 67 ± 1 | 145 mS/cm | 45 ± 2 | 250 ± 11 |
| 2 | 2.4 | 74 ± 1 | 166 mS/cm | 39 ± 1 | 215 ± 2 |
| 3 | 2.8 | 104 ± 2 | 163 mS/cm | 36 ± 1 | 222 ± 7 |
| 4 | 3.1 | 134 ± 5 | 168 mS/cm | 33 ± 0.5 | 264 ± 4 |

$^a$Measured using Cl– form of anion exchange membranes under 50° C. and 50% relative humidity conditions.

What is claimed is:

1. A copolymer according to Formula I

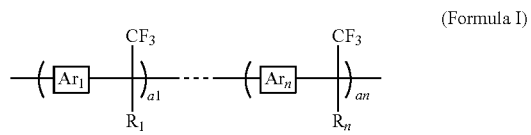

(Formula I)

wherein $Ar_1$, $Ar_a$ are different aryl groups to form random copolymers, and are selected from the group consisting of:

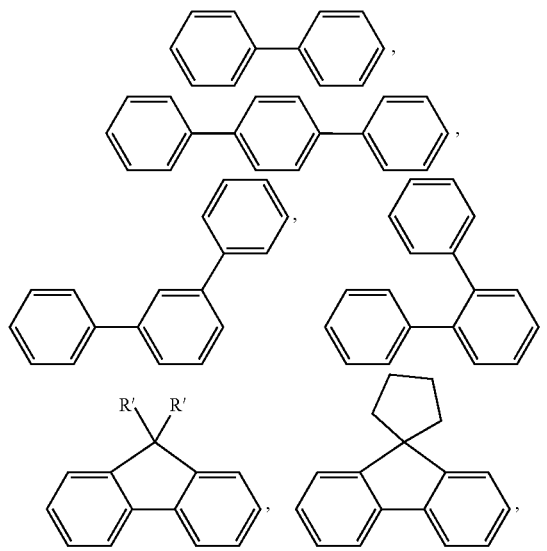

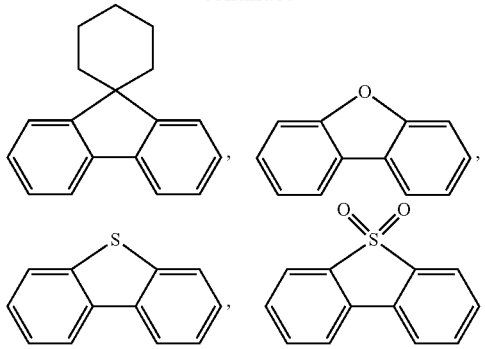

and combinations thereof, wherein R' includes an alkyl group, a halide, or combinations thereof,
wherein n is 2 to 20,
wherein each of $a_1, \ldots$ and $a_n$ is, independently, 10 to 1,000,000, wherein each of $R_1, \ldots$ and $R_a$ is independently:

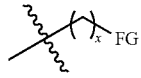

wherein x is from 0 to 20, and
wherein FG is selected from the group consisting of $NR_3^+X^-$, $NR_3^+OH^-$, OH, $NR_2$, $SO_3H$, $P(=O)(OH)_2$, $CO_2H$, $SO_3^-M^+$, $P(=O)(O^-)_2\ 2M^+$, $CO_2^-M^+$ (M=Li, Na, K), linear multi-quaternary ammonium groups, branched multi-quaternary ammonium groups, cross-linked multi-quaternary ammonium groups, and combinations thereof, and R is an alkyl group, and X is a halide.

2. An electrochemical device comprising a hydrocarbon-based polymer membrane comprising the copolymer according to claim 1.

3. The copolymer of claim 1, having the Formula III:

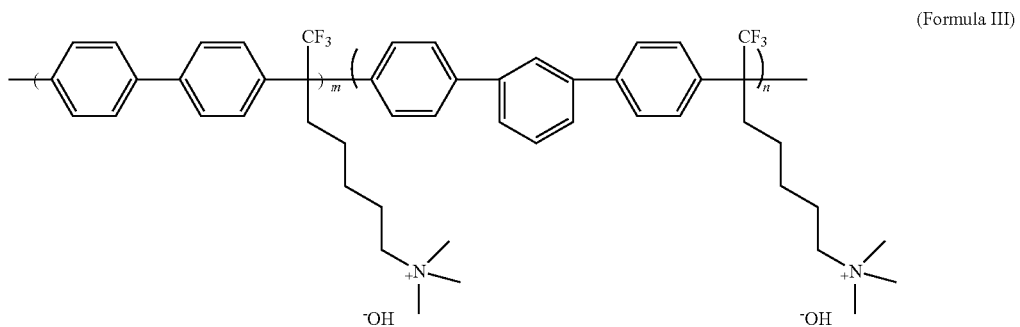

(Formula III)

wherein m and n are each independently 10 to 1,000,000.

4. The copolymer of claim 1, having the Formula IV:

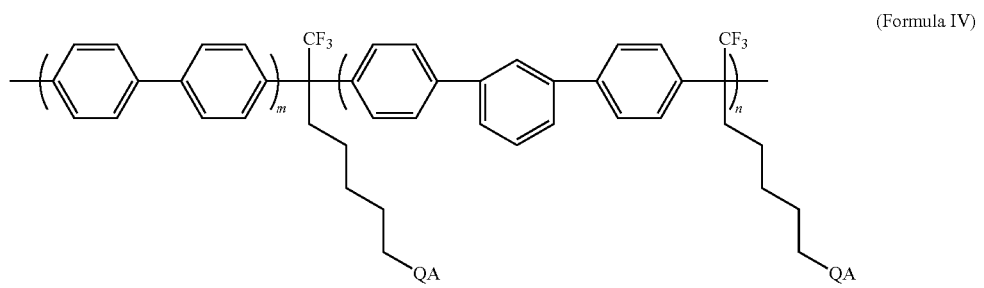

(Formula IV)

wherein m and n are each independently, 10 to 1,000,000, and
wherein QA is $-N^+(CH_3)_3(OH^-)$ or $-N^+(CH_3)_3(OH^-)(CH_2)_6N^+(CH_3)_3(OH^+)$.

5. The copolymer of claim 3, wherein the R1 ... Rn are crosslinked by a crosslinking agent selected from the group consisting of:

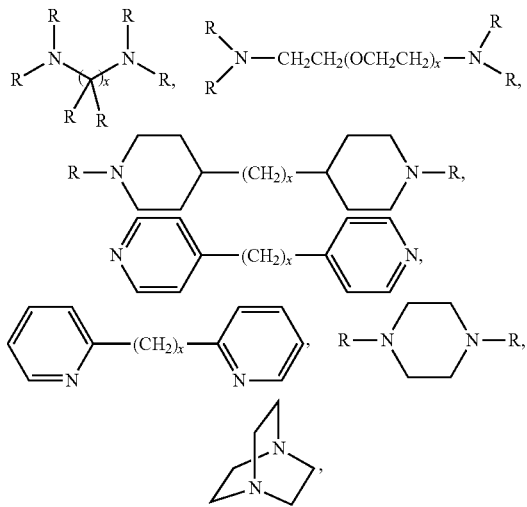

NHR$_2$, N,N,N',N'-tetramethy1-1,6-hexanediamine, bis(2-dimethylaminoethyl)ether, diamines, multi-amines or combinations thereof, wherein R includes H, an alkyl group, or combinations thereof; and x is from 0 to 20.

6. The copolymer of claim 5, wherein the degree of crosslinking is from 10% to 30%.

7. The copolymer of claim 1, wherein the copolymer has an ion exchange capacity (IEC) of from about 0.5 to about 5.0 mequiv/g.

8. An ion exchange membrane comprising the copolymer of claim 3.

9. The ion exchange membrane of claim 8, wherein the ion exchange membrane has a mechanical stress greater than 30 MPa at about 50° C. and about 50% relative humidity.

10. The ion exchange membrane of claim 8, wherein the copolymer has a linear swelling ratio of about 10% to about 50% at 20° C. with hydroxide counter anions under deionized water.

11. The ion exchange membrane of claim 8, having a hydroxide conductivity greater than 80 mS/cm under deionized water at 80° C.

12. An ion exchange membrane comprising the copolymer of claim 3 and one or more dopants.

13. The ion exchange membrane of claim 12, the one or more dopants include phosphoric acid-based proton conductors.

14. An electrochemical device comprising the ion exchange membrane of claim 12, that is capable of operating at temperatures above about 80° C.

15. An ion exchange membrane comprising a copolymer according to claim 4.

16. The ion exchange membrane of claim 15, wherein the random copolymer has an ion exchange capacity (IEC) of from about 0.5 to about 5.0 mequiv/g.

17. The copolymer of claim 4, wherein the copolymer has an ion exchange capacity (IEC) of from about 0.5 to about 5.0 mequiv/g.

18. An ion exchange membrane comprising the copolymer of claim 4 and one or more dopants.

* * * * *